May 11, 1926.
H. M. STOLLER
1,583,809
DYNAMO ELECTRIC MACHINE
Filed April 18, 1924
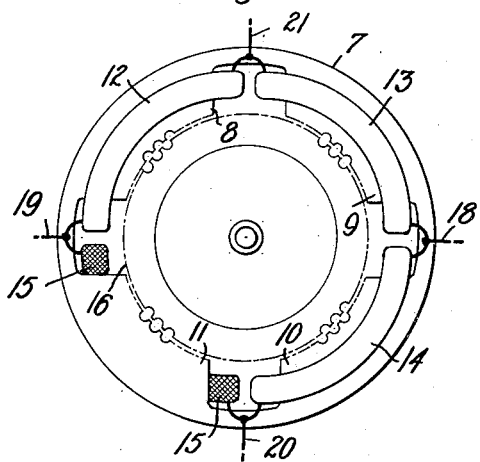
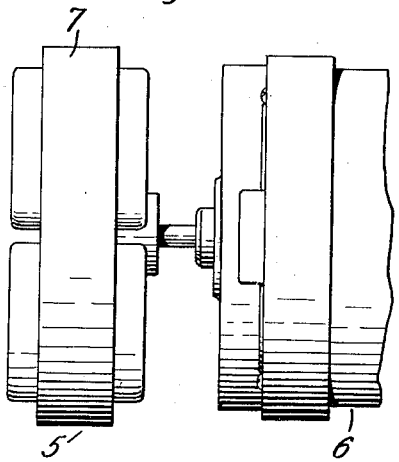
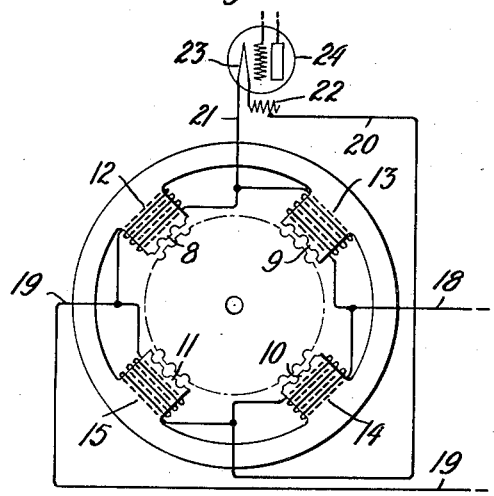
Inventor:
Hugh M. Stoller
by C.W. Adams Att'y Patented May 11, 1926.

1,583,809

UNITED STATES PATENT OFFICE.

HUGH M. STOLLER, OF MOUNTAIN LAKES, NEW JERSEY, ASSIGNOR TO WESTERN ELECTRIC COMPANY, INCORPORATED, OF NEW YORK, N. Y., A CORPORATION OF NEW YORK.

DYNAMO-ELECTRIC MACHINE.

Application filed April 18, 1924. Serial No. 707,333.

This invention relates to alternating current generators, and particularly to generators of the inductor type.

In vacuum tube circuits, it is often desirable to supply the filament heating current from a generator rather than from a battery. The ordinary direct current generator has a commutator ripple which produces a variation in the filament current and a corresponding variation in the space current of the tube, and such variations are impressed on the receiving apparatus along with the amplified current. This causes disturbances in the received signals which, in the case of high ratio amplifiers, may be so great as to make the received signals unintelligible, and in most other cases the disturbance is highly objectionable.

It is an object of this invention to design a generator for supplying current which is free from objectionable disturbances over a given frequency range.

It is a further object of this invention to improve and simplify the construction of inductor alternators.

A feature of the invention comprises the use of a generator which produces a super-audible frequency of the order of 15,000 cycles per second which is free from modulations at an audible frequency for supplying the heating current to thermionic devices. A further feature of the invention comprises the use in generators of the inductor type of a single set of windings for both excitation and induction. A further feature of the invention comprises the use of a bridge arrangement for connecting the windings so that the exciting current does not appear at the alternating current terminals or vice versa.

This invention will be more readily understood by reference to the following description in connection with the drawing in which: Fig. 1 is an end view of a generator embodying this invention. Fig. 2 is a side elevation of the generator shown in Fig. 1. Fig. 3 is a diagrammatical drawing of the alternator showing the method of connecting the windings.

Referring to the drawing, a generator 5 is directly connected to a motor 6 which may be, for example, an alternating current motor receiving its power from a 110 volt 60 cycle lighting circuit or some other suitable power source. The generator consists of a stationary field structure 7 having salient poles 8, 9, 10 and 11, on which are mounted windings 12, 13, 14 and 15. The inner faces of the pole pieces are provided with a plurality of regularly spaced teeth. Inside the field structure is a rotary inductor 16. This inductor is provided with teeth of the same shape and pitch as the teeth on the pole faces. In order to avoid confusion, the drawing shows teeth on only a portion of the inductor and each pole face but it is to be understood that teeth are provided over the entire circumference of the inductor and throughout the pole faces. The pole pieces are so arranged that when the teeth on one pole are directly opposite the teeth on the inductor, the teeth on the adjacent two poles are staggered with respect to the inductor teeth. As the rotor is turned, the flux through any given pole will pulsate at a frequency equal to the product of the number of rotor teeth and the revolutions per second of the rotor. In the embodiment of the invention shown, there are 250 teeth on the inductor and when the machine is run at a speed of 3600 revolutions per minute it gives a frequency of 15,000 cycles per second which is sufficiently above the audible range not to interfere with the operation of the vacuum tube.

This permits the desired high frequency to be generated at an inductor speed of rotation of sixty revolutions per second. By increasing the number of teeth the same frequency of generated current can be obtained at a still lower machine speed. An advantage of keeping the machine speed low is seen from the fact that variations in the high frequency output produced by irregularities in the machine, such as variations in the air-gap, are of the same order of frequency as the rotational speed, so that if this speed is low the frequency of the variation of the generated current is also low. These low frequency variations are in this way kept near the lower limit of the audible frequency range and, therefore, do not produce an objectionable noise, particularly since, in the case of a carefully constructed machine at least, they are of low amplitude.

It should also be noted that when the machine is used for supplying heating current to an amplifier, the effect of these low frequency variations is still less than when it is used in connection with a detector.

This arises from the fact that these variations are in fact modulations of the inaudible frequency heating current and are not perceptible to the ear until detected by the tube. Since the detecting or rectifying action in a well constructed amplifier circuit can be made very small, the disturbance produced by these variations in the high frequency current is much less than would be the case if a current of the same low frequency as the disturbance were impressed on the tube circuit.

Fig. 3 shows the circuit of the generator, which is arranged in the form of a bridge. Direct current for excitation is supplied to the leads 18 and 19, while the generated alternating current is led off by leads 20 and 21 which are here shown connected through a rheostat 22 to the filament 23 of vacuum tube 24. It will be seen that the windings are so arranged that two adjacent poles are of one polarity, while the other two are of the opposite polarity. When the rotor is in the position in which the stator and rotor teeth match on one pair of poles, a flux passing through the coils on these poles will be a maximum, and the flux passing through the coils on the other pair of poles will be a minimum as the teeth under the latter pair will not match. The alternating electromotive forces induced in the windings on these two pairs of poles will therefore be 180 electrical degrees out of phase.

It is apparent that, if the bridge is balanced, the direct current excitation will not appear at the alternating current terminals or the generated electromotive force at the direct current terminals. All the windings being alike, the natural resistance balance of the circuit prohibits the direct current excitation from appearing at the alternating current terminals. Owing to the fact that the electromotive forces generated in adjacent poles are 180° out of phase the sums of the electromotive forces generated in coils 12 and 13 will be zero, and similarly for the coils 14 and 15 while in coils 12 and 15, and 13 and 14, they will add up thus:

$e_{12} = E \sin \theta$
$e_{13} = E \sin (\theta+180°) = -E \sin \theta$
$e_{14} = E \sin \theta$
$e_{15} = E \sin (\theta+180°) = -E \sin \theta$ where E is the maximum generated voltage, which is the same for all coils, and $e_{12}$, $e_{13}$, $e_{14}$ and $e_{15}$ are the instantaneous voltages in the coils 12, 13, 14, and 15 respectively. The alternating current voltage across 18 and 19 will therefore be:

$e_{12}+e_{13} = E \sin \theta + (-E \sin \theta) = 0$
$e_{14}+e_{15} = E \sin \theta + (-E \sin \theta) = 0$ and that across 20 and 21:

$e_{12}-e_{15} = E \sin \theta - (-E \sin \theta) = 2 E \sin \theta$
$e_{14}-e_{13} = E \sin \theta - (-E \sin \theta) = 2 E \sin \theta$ Various changes can be made in the machine without departing from the spirit of the invention, as defined in the appended claims; for example, it may sometimes be desirable to build a machine with a greater number of poles in which each branch of the bridge is composed of two or more windings connected in series or parallel.

What is claimed is:

1. An alternating current generator comprising a stator, a stator winding connected in a closed series circuit and interlinked with a plurality of magnetic circuits in said stator, an input circuit connected to said winding at two diametrically opposed points for supplying an energizing current to said winding, an output circuit connected to said winding at two diametrically opposed points different from the said input connections, and a rotor for said generator constructed and arranged to periodically vary the reluctance of the several magnetic circuits of said generator.

2. An alternating current generator comprising a stator, a stator winding connected in a closed series circuit and interlinked with a plurality of magnetic circuits in said stator, an input circuit connected to said winding at two diametrically opposed points for supplying an energizing current to said winding, an output circuit connected to said winding at two diametrically opposed points different from said input connections, a rotor for said generator having teeth cut in the face thereof and arranged to move past the face of said stator and in close proximity thereto, said stator having teeth of corresponding size cut in the face thereof and arranged so that at any one position of the stator, the teeth of said stator and said rotor register with each other in certain of said magnetic circuits and do not register with each other in certain others of said magnetic circuits whereby the reluctance of said magnetic circuits is alternately and periodically varied.

3. A dynamo electric machine comprising a mutiple of four pole pieces, a winding on each of said pole pieces, connections between said windings for arranging said windings in the form of a Wheatstone bridge, means for applying direct current to one set of terminals of said bridge, and means for leading induced alternating current from the opposite pair of terminals of said bridge.

In witness whereof, I hereunto subscribe my name this 9th day of April, A. D. 1924.

HUGH M. STOLLER.